(12) United States Patent
Kim

(10) Patent No.: US 11,422,889 B2
(45) Date of Patent: Aug. 23, 2022

(54) MEMORY SYSTEM AND CONTROLLER FOR STORING MAP DATA OF VOLATILE MEMORY INTO NONVOLATILE MEMORY DEVICE DURING POWER OFF OPERATION

(71) Applicant: SK hynix Inc., Gyeonggi-do (KR)

(72) Inventor: Do Hun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/192,389

(22) Filed: Mar. 4, 2021

(65) Prior Publication Data
US 2022/0121517 A1 Apr. 21, 2022

(30) Foreign Application Priority Data
Oct. 15, 2020 (KR) ........................ 10-2020-0133494

(51) Int. Cl.
| | | |
|---|---|---|
| G06F 11/10 | (2006.01) | |
| G06F 11/00 | (2006.01) | |
| G06F 12/10 | (2016.01) | |
| G06F 12/1081 | (2016.01) | |
| G06F 12/1009 | (2016.01) | |
| G06F 11/14 | (2006.01) | |

(52) U.S. Cl.
CPC ...... *G06F 11/1068* (2013.01); *G06F 11/1048* (2013.01); *G06F 11/1417* (2013.01); *G06F 12/1009* (2013.01); *G06F 12/1081* (2013.01)

(58) Field of Classification Search
CPC ............. G06F 11/1068; G06F 11/1048; G06F 11/1417; G06F 12/1009; G06F 12/1081
See application file for complete search history.

(56) References Cited

U.S. PATENT DOCUMENTS

| | | | | |
|---|---|---|---|---|
| 9,223,662 | B2* | 12/2015 | Flynn | ...................... G06F 3/0619 |
| 9,767,017 | B2* | 9/2017 | Talagala | .............. G06F 12/0246 |
| 10,389,380 | B2* | 8/2019 | Yuan | ...................... G06F 3/0679 |
| 2020/0058365 | A1* | 2/2020 | Kim | ....................... G11C 29/76 |
| 2021/0390179 | A1* | 12/2021 | Hahn | ................... G06F 13/1673 |

FOREIGN PATENT DOCUMENTS

KR 10-2018-0051706 5/2018

* cited by examiner

*Primary Examiner* — Justin R Knapp
(74) *Attorney, Agent, or Firm* — IP & T Group LLP

(57) ABSTRACT

A memory system includes: a nonvolatile memory device; a processor configured to generate a first map chunk including mapping information for accessing the nonvolatile memory device; a first error correction code (ECC) component configured to generate a first map codeword by adding a first parity bit to the first map chunk; a volatile memory configured to store the first map codeword; a second ECC component configured to generate first map data by performing decoding on the first map codeword that is outputted from the volatile memory and bypasses the first ECC component when the memory system is powered off; and a direct memory access (DMA) component configured to provide the first map data to the nonvolatile memory device.

20 Claims, 8 Drawing Sheets

MEMORY SYSTEM AND CONTROLLER FOR STORING MAP DATA OF VOLATILE MEMORY INTO NONVOLATILE MEMORY DEVICE DURING POWER OFF OPERATION

CROSS-REFERENCE TO RELATED APPLICATION

This application claims priority under 35 U.S.C. § 119 to Korean Patent Application No. 10-2020-0133494 filed on Oct. 15, 2020, which is incorporated herein by reference in its entirety.

BACKGROUND

1. Field

Embodiments relate to a memory system including a nonvolatile memory device and a controller that controls the nonvolatile memory device.

2. Discussion of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSDs).

SUMMARY

Various embodiments are directed to a controller and a memory system, capable of shortening the time for flushing data, which is protected by ECC encoding among data stored in a volatile memory, to a nonvolatile memory device.

Various embodiments are directed to a controller and a memory system, capable of shortening the power-off time by rapidly flushing a large amount of map data stored in a volatile memory to a memory device when the memory system is powered off.

The technical problems to be achieved by the present embodiment are not limited to the technical problems described above, and other technical problems may be inferred from the following embodiments.

In accordance with an embodiment, a memory system includes: a nonvolatile memory device; a processor configured to generate a first map chunk including mapping information for accessing the nonvolatile memory device; a first error correction code (ECC) component configured to generate a first map codeword by adding a first parity bit to the first map chunk; a volatile memory configured to store the first map codeword; a second ECC component configured to generate first map data by performing decoding on the first map codeword that is outputted from the volatile memory and bypasses the first ECC component when the memory system is powered off; and a direct memory access (DMA) component configured to provide the first map data to the nonvolatile memory device.

The first ECC component may have a lower latency than the second ECC component, and the second ECC component may have a higher throughput than the first ECC component.

The memory system may further include: a third ECC component configured to generate the first map data by performing the decoding on the first map codeword in parallel with the second ECC component when the memory system is powered off.

In a first mode, the first map data may be a first map chunk in which the first parity bit has been removed from the decoded first map codeword, and in a second mode, the first map data may be a first map codeword in which the first parity bit of the decoded first map codeword is maintained.

In the first mode, the DMA component may further provide the first ECC component with the first map chunk acquired from the nonvolatile memory device when the memory system is booted, and in the second mode, the DMA component may further provide the volatile memory with the first map codeword acquired from the nonvolatile memory device when the memory system is booted by bypassing the first ECC component.

The volatile memory may further store a second map codeword including a second map chunk generated by the processor and a second parity bit added by the first ECC component, when the memory system is powered off, the first ECC component may generate a second map chunk by performing decoding on the second map codeword and removing the second parity bit therefrom, and the DMA component may further provide the second map chunk to the nonvolatile memory device.

The first map codeword may be a map codeword that is aligned to have a size of a power of 2, and the second map codeword may be an unaligned codeword that does not have a size of a power of 2.

The aligned codeword may include a logical to virtual (L2V) map codeword, and the unaligned codeword may include a valid page table (VPT) codeword.

In a first mode, the first map data may be a first map chunk in which the first parity bit has been removed from the decoded first map codeword, and in a second mode, the first map data may be a first map codeword in which the first parity bit of the decoded first map codeword is maintained.

In the first mode, the DMA component may further provide the first ECC component with the first map chunk acquired from the nonvolatile memory device when the memory system is booted, and in the second mode, the DMA component may further provide the volatile memory with the first map codeword acquired from the nonvolatile memory device when the memory system is booted by bypassing the first ECC component.

The DMA component may further provide the first ECC component with second map data acquired from the nonvolatile memory device when the memory system is booted, and the first ECC component may generate a second map codeword by adding a parity bit to the second map chunk, and further provide the second map codeword to the volatile memory.

The memory system may further include: a fourth ECC component configured to perform encoding in order to store the first map data and the second map chunk in the nonvolatile memory device, and perform error correction decoding on data acquired from the nonvolatile memory device.

In accordance with an embodiment, a controller including a nonvolatile memory device, includes: a processor configured to generate a first map chunk including mapping information for accessing the nonvolatile memory device; a first error correction code (ECC) component configured to generate a first map codeword by adding a first parity bit to the first map chunk generated by the processor; a volatile memory configured to store the first map codeword; a second ECC component configured to generate first map data by performing error correction decoding on the first map codeword that is outputted from the volatile memory and bypasses the first ECC component when the memory system is powered off; and a direct memory access (DMA) component configured to provide the first map data to the nonvolatile memory device.

In accordance with an embodiment, a memory system includes: a nonvolatile memory device; and a controller coupled to the nonvolatile memory device and including: a volatile memory; a processor configured to generate a map chunk including mapping information for accessing the nonvolatile memory device; a first error correction code (ECC) component configured to encode the map chunk to generate a map codeword and provide the map codeword to the volatile memory such that the map codeword is stored in the volatile memory, the map codeword including the map chunk and a parity bit; and a memory interface coupled between the volatile memory and the nonvolatile memory device and between the first ECC component and the nonvolatile memory device, wherein the memory interface includes: a second ECC component configured to receive the map codeword from the volatile memory when the memory system is powered off, and decode the received map codeword to generate map data, the second ECC component having a higher throughput the first ECC component; and a direct memory access (DMA) component configured to receive the map data and provide the map data to the nonvolatile memory device.

In accordance with the present disclosure, it is possible to provide a controller and a memory system, capable of shortening the time for flushing data, which is protected by ECC encoding among data stored in a volatile memory, to a nonvolatile memory device.

In accordance with the present disclosure, it is possible to provide a controller and a memory system, capable of shortening the power-off time by rapidly flushing a large amount of map data stored in a volatile memory to a memory device when the memory system is powered off.

Effects achievable in the present disclosure are not limited to the aforementioned effects and other unmentioned effects will be clearly understood by those skilled in the art from the following description.

DETAILED DESCRIPTION

Hereinafter, embodiments of the present disclosure will be described with reference to the accompanying drawings. However, the present disclosure is not limited to the embodiments disclosed below, but may be configured in various different forms. Various embodiments of the present disclosure are provided as examples to strengthen the disclosure and assist those skilled in the art to better understand the scope of the present disclosure.

Figure 1:
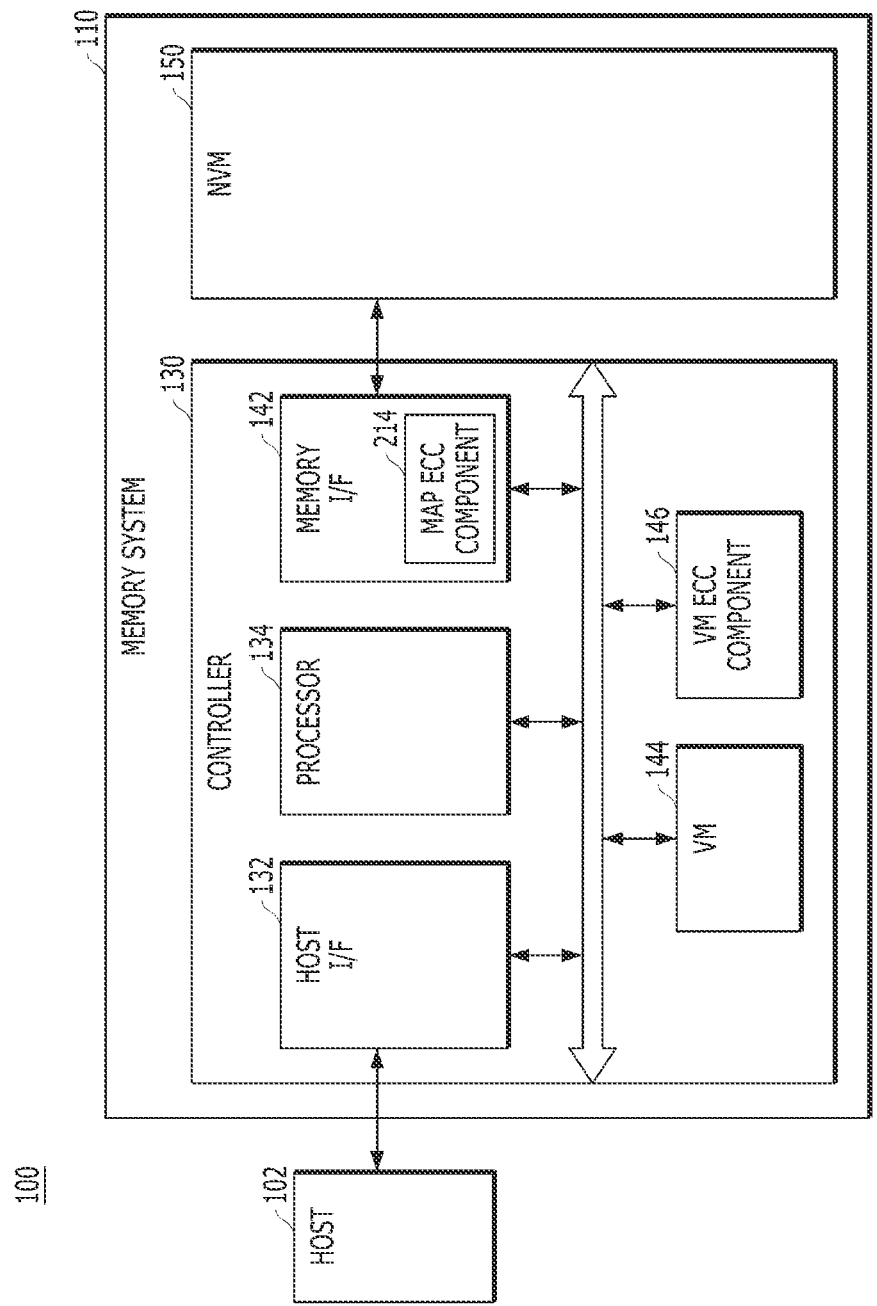
FIG. 1 is a diagram schematically illustrating a data processing system including a memory system in accordance with an embodiment of the present disclosure.

FIG. 1 is a block diagram illustrating a data processing system 100 in accordance with an embodiment of the present invention.

Referring to FIG. 1, the data processing system 100 may include a host 102 operatively coupled to a memory system 110. The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 may include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the like. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a nonvolatile memory device (NVM) 150. The NVM 150 may store data for the host 102. The controller 130 may control data storage into the NVM 150.

The controller 130 and the NVM 150 may be integrated into a single semiconductor device. For example, the controller 130 and the NVM 150 may be integrated as one semiconductor device to constitute a solid state drive (SSD). When the memory system 110 is used as an SSD, the operating speed of the host 102 connected to the memory system 110 can be improved. In addition, the controller 130 and the NVM 150 may be integrated as one semiconductor device to constitute a memory card. For example, the controller 130 and the NVM 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The NVM 150 may retain data stored therein even though power is not supplied. The NVM 150 may store data provided from the host 102 through a program operation, and provide data stored therein to the host 102 through a read operation. The NVM 150 may include a plurality of memory blocks each of which may include a plurality of pages, and each of the pages may include a plurality of memory cells coupled to a word line.

In an embodiment, the NVM 150 may include a flash memory device. The flash memory device may have a 3-dimensional (3D) stack structure. The flash memory device may store data in a memory cell array including memory cell transistors. The flash memory device may have a hierarchical structure of memory die, plane, memory block and page. One memory die may receive one command at a time. The flash memory device may include a plurality of memory dies. One memory die may include a plurality of planes, and the plurality of planes may process commands received by the memory die in parallel. Each of the planes may include a plurality of memory blocks. Each memory block may correspond to the minimum unit of an erase operation. One memory block may include a plurality of pages. The page may correspond to the minimum unit of a program operation.

The controller 130 may control the NVM 150 in response to a request from the host 102. For example, the controller 130 may provide data read from the NVM 150 to the host 102, and store data provided from the host 102 into the NVM 150. For this operation, the controller 130 may control read, program and erase operations of the NVM 150.

The controller 130 may include a host interface (I/F) 132, a processor 134, a memory I/F 142, a volatile memory (VM) 144, and a VM error correction code ECC component (146) all operatively coupled via an internal bus.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The host I/F 132 may be driven through firmware referred to as a host interface layer (HIL) in order to exchange data with the host 102.

The memory I/F 142 may serve as a memory/storage interface for interfacing the controller 130 and the NVM 150 such that the controller 130 controls the NVM 150 in response to a request from the host 102. When the NVM 150 is a flash memory, for example, a NAND flash memory, the memory I/F 142 may generate a control signal for the NVM 150 and process data to be provided to the NVM 150 under the control of the processor 134. The memory I/F 142 may work as an interface (e.g., a NAND flash interface) for processing a command and data between the controller 130 and the NVM 150. Specifically, the memory I/F 142 may support data transfer between the controller 130 and the NVM 150.

The memory I/F 142 may be driven through firmware referred to as a flash interface layer (FIL) in order to exchange data with the NVM 150.

The memory I/F 142 may include an NVM ECC (not illustrated) component in order to detect and correct an error included in data read from the NVM 150. The NVM ECC component may include an NVM ECC encoder and an NVM ECC decoder. The NVM ECC encoder may error-correct-encode data to be programmed into the NVM 150 and generate data to which a parity bit is added. The data to which the parity bit is added may be stored in the NVM 150. The NVM ECC decoder may detect and correct the error included in the data outputted from the NVM 150. The NVM ECC component may perform the error correction by using coded modulation such as a low density parity check (LDPC) code. The NVM ECC component is not limited to a specific structure. The NVM ECC component may include all circuits, modules, systems, and devices for the error correction.

The processor 134 may control the overall operations of the memory system 110. The processor 134 may be realized as a microprocessor or a central processing unit (CPU).

The processor 134 may drive the FTL and perform a foreground operation corresponding to a request received from the host 102. For example, the processor 134 may control a write operation of the NVM 150 in response to a write request from the host 102 and control a read operation of the NVM 150 in response to a read request from the host 102. For example, the processor 134 may perform mapping between a logical address used in a file system of the host 102 and a physical address used in the NVM 150.

The controller 130 may perform a background operation onto the NVM 150 through the processor 134. For example, the background operation may include a garbage collection (GC) operation, a wear-leveling (WL) operation, a map flush operation, or a bad block management operation.

The processor 134 may execute firmware (FW) called a flash translation layer (FTL) in order to perform a foreground operation and a background operation.

The VM 144 may store map data including address mapping information between the logical address and the physical address. The map data may be stored in the NVM 150, and may be loaded into the VM 144 when the memory system 110 is powered on. An error may occur in the map data loaded into the VM 144 due to various factors. In order for the memory system 110 to accurately access data requested by the host 102, error correction for the map data stored in the VM 144 is required.

The VM ECC component 146 may detect and correct the error in the map data stored in the VM 144. For example, the VM ECC component 146 may error-correct encode a map chunk generated by the processor 134 and generate a map codeword to which a parity bit is added. The smallest unit of the map data may be referred to as a map piece. For example, the map piece may include a logical to physical (L2P) piece indicating a mapping relation between one logical address and one physical address. The map chunk may include a predetermined number of map pieces. The map chunk refers to a unit of map data on which an error correction operation is performed at one time by the VM ECC component 146. The map codeword may be stored in the VM 144. When there is a request from the processor 134 for the map chunk, the VM ECC component 146 may detect and correct an error in the map codeword corresponding to the map chunk, remove a parity bit from the error-corrected map codeword to generate a map chunk, and provide the map chunk to the processor 134.

In an embodiment, the VM ECC component 146 may perform error correction by using coded modulation such as a Bose, Chaudhuri, Hocquenghem (BCH) code. The VM ECC component 146 is not limited to a specific structure. The VM ECC component 146 may include all circuits, modules, systems, and devices for the error correction.

Hereinafter, the parity bit added by the VM ECC component 146 is referred to as a VM parity bit and the parity bit added by an NVM ECC component is referred to as an NVM parity bit.

In order to quickly process a command from the host 102, the processor 134 needs to quickly translate a logical address in the command into a physical address. In order to quickly translate the logical address into the physical address, the processor 134 needs to quickly acquire a map chunk including the logical address from the VM 144. In order to quickly provide a map chunk with no error to the processor 134, the VM ECC component 146 may be designed to have a short latency. For example, the VM ECC component 146 may have a complex function such as a cache for caching the map chunk referred to by the processor 134 in order to speed up the processing of the map chunk, in addition to the error correction function. The VM ECC component 146 having the complex function may be implemented by a plurality of logic gates, for example, about 2 million logic gates and may occupy a wide area in the circuit of the memory system 110.

Generally, when the VM ECC component 146 is designed, throughput may be less considered than the latency. This is because, in many cases, the processor 134 requests a small number of map chunks required for processing a request from the host 102, rather than requesting a plurality of map chunks at one time.

When the memory system 110 is powered off, the processor 134 may control the memory I/F 142 to store map chunks, which are included in a plurality of map codewords stored in the VM 144, in the NVM 150. In order to guarantee the reliability of the memory system 110, it is necessary to detect and correct errors in map codewords including the map chunks before the map chunks are stored in the NVM 150.

Since the throughput has been less considered when the VM ECC component 146 is designed, the VM ECC component 146 may have a lower throughput than the memory I/F 142. When the memory system 110 is powered off, if the VM ECC component 146 needs to detect and correct errors in a plurality of map codewords of the VM 144 to generate error-corrected map chunks and then the memory I/F 142 needs to store the map chunks in the NVM 150, a bottleneck may occur in the VM ECC component 146. When the bottleneck occurs in the VM ECC component 146, the power-off time of the memory system 110 may be delayed. When the power-off time of the memory system 110 is delayed, it is difficult to satisfy the request for the power-off time of the memory system 110 and to guarantee the reliability of the memory system 110 in a sudden power-off situation.

On the other hand, a method of designing the VM ECC component 146 in consideration of both the latency and throughput thereof in order to substantially prevent the bottleneck may increase an area occupied by the VM ECC component 146 in the circuit of the memory system 110 and increase power consumed by the VM ECC component 146. For example, when the number of VM ECC components 146 is increased and the VM ECC components 146 are disposed in parallel in order to improve the throughput, the circuit area may be widened by the increased number of VM ECC components 146 and power consumption may increase.

In accordance with the embodiment of the present disclosure, the memory I/F 142 may include a map ECC component 214 for performing error correction decoding on the map codeword with a high throughput when the memory system 110 is powered off. The map ECC component 214 may be designed in consideration of the throughput rather than the latency. A plurality of map ECC components 214 may be included to improve the throughput, but an additional function such as the cache function may be excluded. For example, the map ECC component 214 from which the additional function has been excluded may be implemented with about 50,000 logic gates. For example, when four map ECC components 214 are included in the memory I/F 142, the map ECC components 214 may be implemented with about 200,000 logic gates.

When the memory system 110 is powered off, the plurality of map codewords stored in the VM 144 may bypass the VM ECC component 146. The memory I/F 142 may detect and correct errors in the map codewords by using the map ECC 214 component and provide error-corrected map codewords or map chunks to the NVM 150.

In accordance with the embodiment of the present disclosure, it is possible to substantially prevent the bottleneck caused due to a low throughput of the VM ECC component 146 and to shorten the power-off time of the memory system 110.

Figure 2:
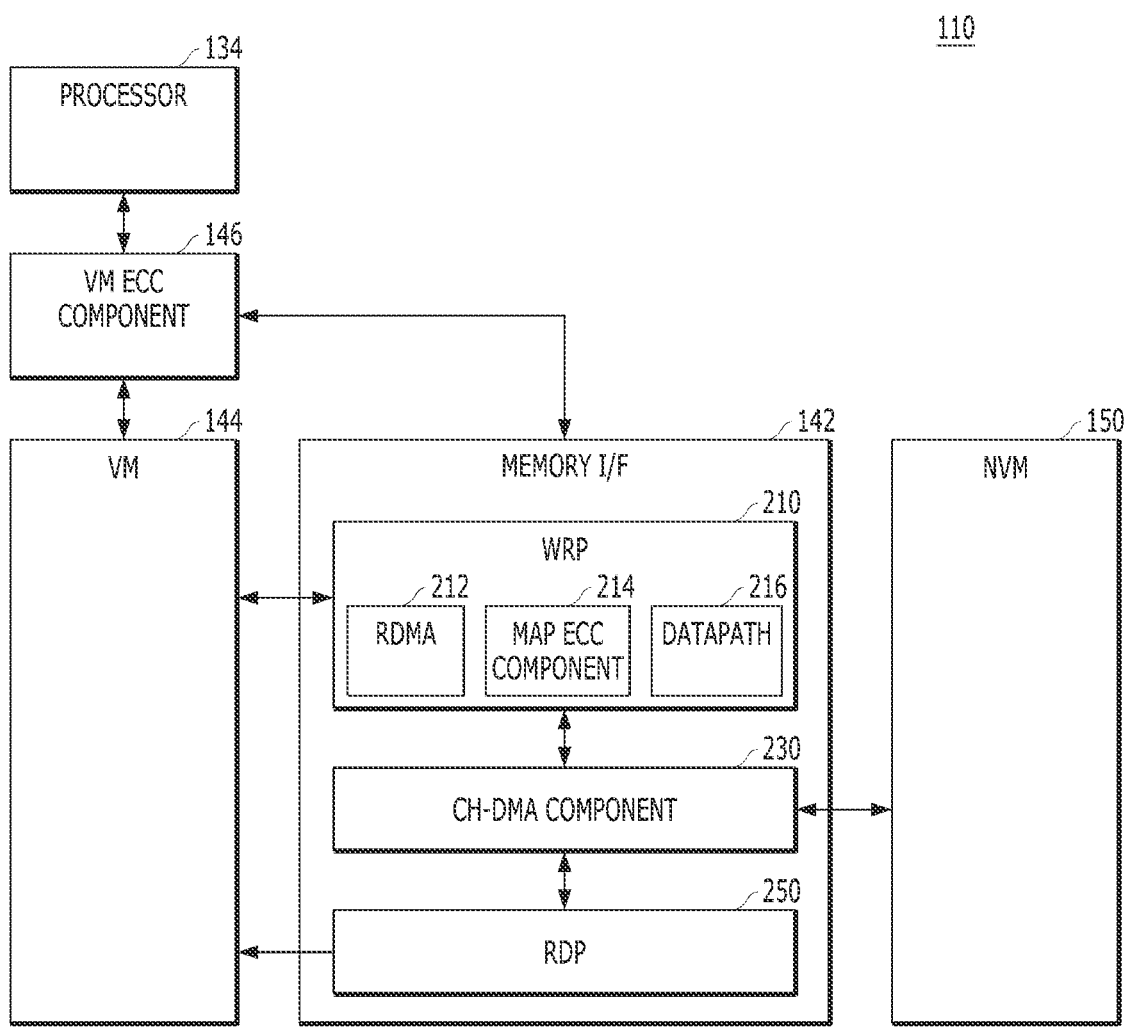
FIG. 2 is a diagram illustrating a memory system in accordance with an embodiment of the present disclosure.

FIG. 2 is a diagram illustrating the memory system 110 in accordance with an embodiment of the present disclosure.

FIG. 2 illustrates only the processor 134, the memory I/F 142, the VM 144, the VM ECC component 146, and the NVM 150 among the components of the memory system 110 described with reference to FIG. 1. FIG. 2 does not illustrate the components of the memory system 110 other than the components for explaining the embodiment of the present disclosure.

The memory I/F 142 may include a write path (WRP) 210, a channel direct memory access (CH-DMA) component 230, and a read path (RDP) 250.

The CH-DMA component 230 may perform a data input/output operation between the VM 144 and the NVM 150. When the processor 134 provides a request to the memory I/F 142 in order to perform data input/output, the CH-DMA component 230 may perform the data input/output operation in response to the request without the intervention of the processor 134.

Data outputted from the VM 144 may pass through the WRP 210 before being programmed into the NVM 150 through the CH-DMA component 230. In some embodiments, the WRP 210 may include a read DMA (RDMA) component 212, the map ECC component 214, and a data path 216.

The RDMA component 212 may acquire data, which is to be programmed into the NVM 150, from the VM 144 without the intervention of the processor 134.

The map ECC component 214 may perform error correction decoding on the plurality of map codewords stored in the VM 144 when the memory system 110 is powered off.

The map ECC component 214 may perform the error correction decoding by using substantially the same coded modulation as the VM ECC component 146. For example, when the VM ECC component 146 performs error correction encoding and decoding by using the BCH code, the map ECC component 214 may also perform the error correction decoding by using the BCH code.

The data to be programmed into the NVM 150 from the VM 144 may pass through the data path 216. The data path 216 may include an NVM ECC encoder (not illustrated). The data to be programmed may be encoded by the NVM ECC encoder and an NVM parity bit may be added thereto.

Data outputted from the NVM 150 may be stored in the VM 144 via the CH-DMA component 230 and the RDP 250. The RDP 250 may include an NVM ECC decoder (not illustrated). The data outputted from the NVM 150 may include the NVM parity bit and may be decoded by the NVM ECC decoder.

The NVM 150 may include a plurality of memory dies (not illustrated). In order to improve the throughput of the NVM 150, the memory I/F 142 may include a plurality of WRPs 210, CH-DMA components 230, and RDPs 250. The memory I/F 142 may simultaneously control the plurality of memory dies by using the plurality of WRPs 210, CH-DMA components 230, and RDPs 250. When the memory I/F 142 includes the plurality of WRPs 210, a plurality of map ECC components 214 may also be included and may simultaneously detect and correct errors in a plurality of map codewords.

In accordance with the embodiment of the present disclosure, the map ECC component 214 may selectively remove the VM parity bit in the decoded map codeword, or may substantially maintain the map codeword including the VM parity bit. That is, the map codeword decoded by the map ECC 214 may also pass through the data path 216 as a map chunk, or may be stored as a map codeword in the NVM 150 via the data path 216.

Figure 3:
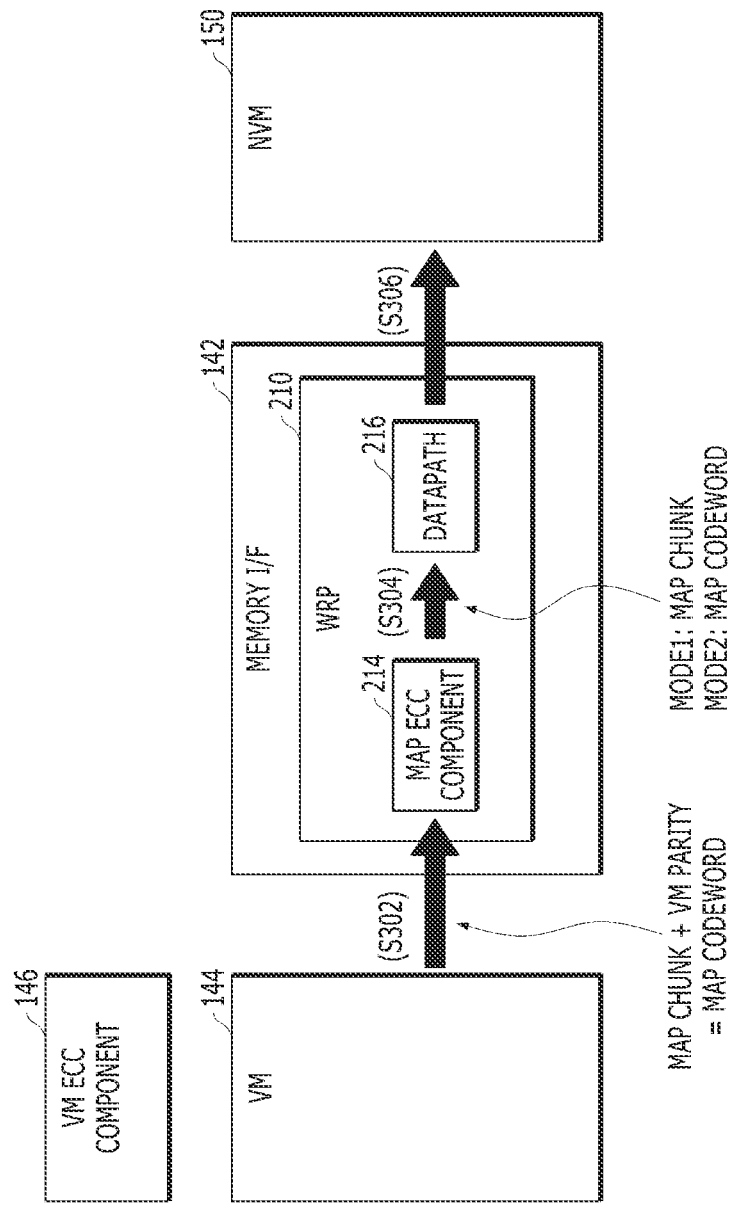
FIG. 3 is a diagram illustrating a power-off operation of a memory system in accordance with an embodiment of the present disclosure.
Figure 4:
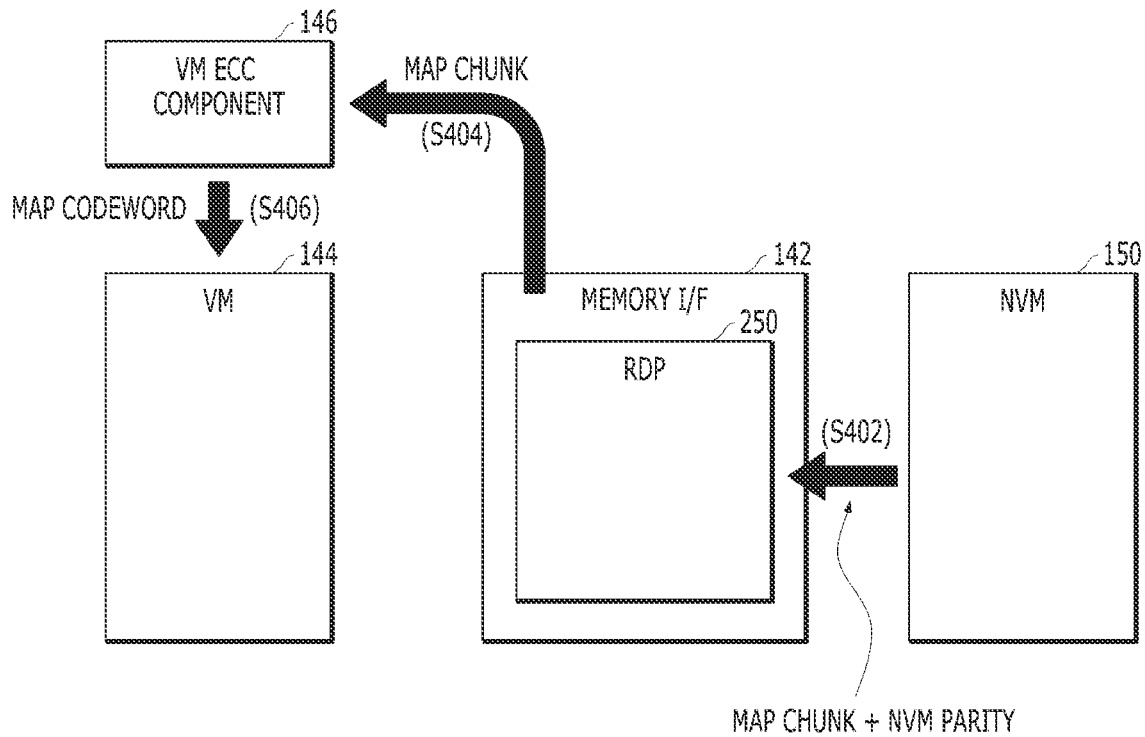
FIG. 4 is a diagram illustrating a booting operation of a memory system in accordance with a first mode.
Figure 5:
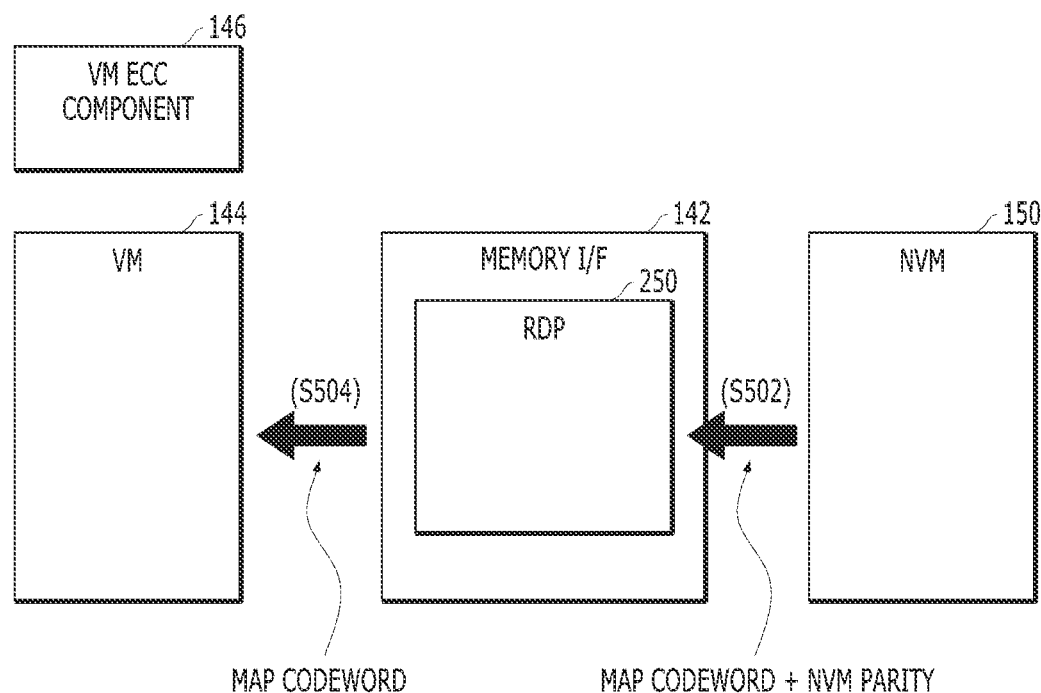
FIG. 5 is a diagram illustrating a booting operation of a memory system in accordance with a second mode.

An embodiment of the present disclosure is described in detail with reference to FIGS. 3 to 5. FIGS. 3 to 5 schematically illustrate illustrates the memory I/F 142, the VM 144, the VM ECC component 146, and the NVM 150 described with reference to FIGS. 1 and 2.

FIG. 3 is a diagram illustrating a power-off operation of the memory system 110 in accordance with an embodiment of the present disclosure.

Referring to FIG. 3, as described with reference to FIG. 1, during the operation of the memory system 110, the VM 144 may store a plurality of map codewords including map chunks and VM parity bits. In response to a power-off signal of the memory system 110, the processor 134 may control the memory I/F 142 to program the plurality of map codewords in the VM 144 into the NVM 150. An operation in which the memory I/F 142 programs the plurality of map codewords into the NVM 150 is described in detail.

In operation S302, the map ECC component 214 may receive the plurality of map codewords from the VM 144 and perform error correction decoding on the received map codewords.

In operation S304, the map ECC component 214 may provide the data path 216 with map data generated by the error correction decoding. In accordance with an embodiment of the present disclosure, the map component ECC 214 may selectively remove the VM parity bits from the plurality of map codewords according to modes, and provide the map codewords without VM parity bits to the data path 216.

In the illustrated example of FIG. 3, when a first mode (i.e., MODE1) is selected in the memory system 110, the map ECC component 214 may remove the VM parity bits from the map codewords to generate map chunks, and provide the map chunks to the data path 216. When a second mode (i.e., MODE2) is selected in the memory system 110, the map ECC component 214 may provide the data path 216 with map codewords from which no VM parity bits have been removed. The first and second modes may be determined when the memory system 110 is implemented, or may be selected by a user. The data path 216 may perform error correction encoding on the map chunks or the map codewords by using an internal NVM ECC encoder (not illustrated), thereby generating map data to which NVM parity bits have been added.

In operation S306, the data path 216 may provide the map data to which NVM parity bits have been added to the NVM 150 through the CH-DMA component 230. The NVM 150 may program the map data to which NVM parity bits have been added. Then, the memory system 110 may be powered off.

A method in which map data is loaded from the NVM 150 to the VM 144 during booting may be changed according to the operation mode of the memory system 110. The method of loading the map data according to each mode is described with reference to FIGS. 4 and 5.

FIG. 4 is a diagram illustrating a booting operation of the memory system 110 in accordance with the first mode.

Referring to FIG. 4, after the memory system 110 is powered on, the processor 134 may control the memory I/F 142 to read map data from the NVM 150 in operation S402.

The NVM 150 may output the map data under the control of the memory I/F 142. An NVM ECC decoder (not illustrated) in the RDP 250 may perform error correction decoding on the outputted map data. When the power-off operation has been performed in the first mode, the map data stored in the NVM 150 may include a plurality of map chunks to which NVM parity bits have been added.

The plurality of map chunks need to be protected from errors while being stored in the VM 144. In operation S404, the memory I/F 142 may provide the VM ECC component 146 with a plurality of error-corrected map chunks. The VM ECC component 146 may perform error correction encoding on the map chunks to add VM parity bits thereto, thereby generating map codewords.

In operation S406, the VM ECC component 146 may store the map codewords in the VM 144 and complete the booting.

FIG. 5 is a diagram illustrating a booting operation of the memory system 110 in accordance with the second mode.

Referring to FIG. 5, after the memory system 110 is powered on, the processor 134 may control the memory I/F 142 such that map data the NVM 150 outputs map data, in operation S502. When the power-off operation has been performed in the second mode, the map data stored in the NVM 150 may include map codewords and NVM parity bits.

The NVM 150 may output a plurality of map codewords, to which the NVM parity bits have been added, under the control of the memory I/F 142. The NVM ECC decoder (not illustrated) in the RDP 250 may perform error correction decoding on the outputted map codewords by using the NVM parity bits.

Map codewords whose errors have been corrected by the NVM ECC decoder may include map chunks and VM parity bits. The map codewords may be protected from errors while being in stored in the VM 144 because they include the VM parity bits.

In operation S504, the memory I/F 142 may directly store the map codewords in the VM 144 by bypassing the VM ECC component 146. When there is a request for the map chunk from the processor 134, the VM ECC component 146 may perform error correction decoding on the map codeword including the map chunk and provide the processor 134 with the error-corrected map chunk. When the memory system 110 operates in the second mode, the bottleneck caused due to the VM ECC component 146 during the booting of the memory system 110 may be solved.

In accordance with an embodiment of the present disclosure described with reference to FIGS. 3 to 5, in order to store, in the NVM 150, map codewords stored in the VM 144, the processor 134 may control the memory I/F 142 such that the map ECC component 214 having a higher throughput than the VM ECC component 146 detects and corrects errors in the map codewords. Accordingly, it is possible to shorten the power-off time of the memory system 110.

In accordance with an embodiment of the present disclosure, in order to store, in the NVM 150, map codewords stored in the VM 144, the processor 134 may control the VM ECC component 146 and the map ECC component 214 such that the VM ECC component 146 or the map ECC component 214 may selectively detect and correct the map codewords according to the type of the map codewords. An embodiment of the present disclosure is described in detail with reference to FIGS. 6A to 6C, 7, 8A, 8B, 9, and 10.

Figure 6A:
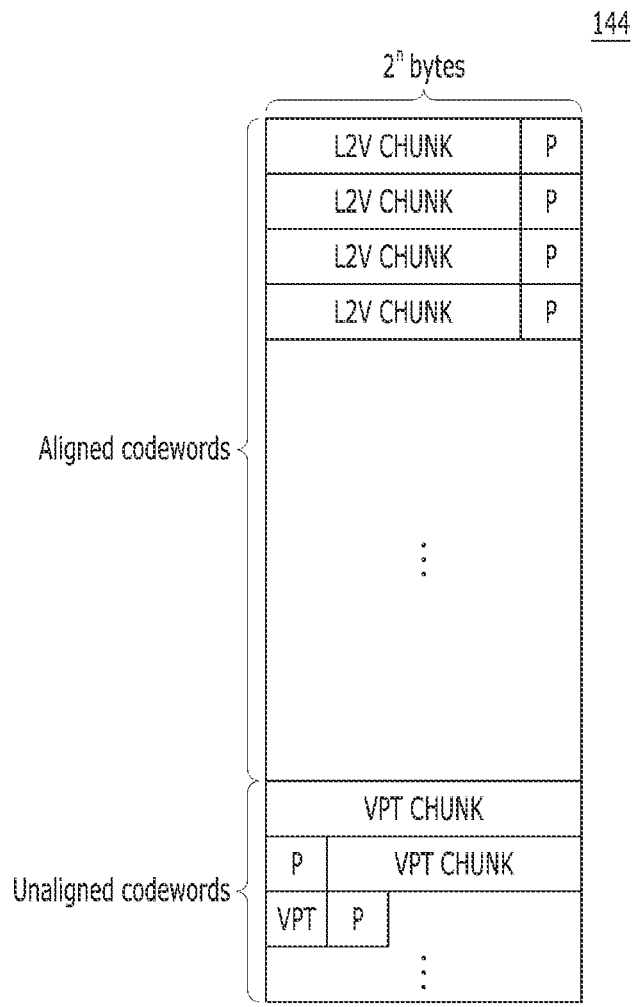
FIG. 6A to FIG. 6C are diagrams illustrating types of map data.
Figure 6B:
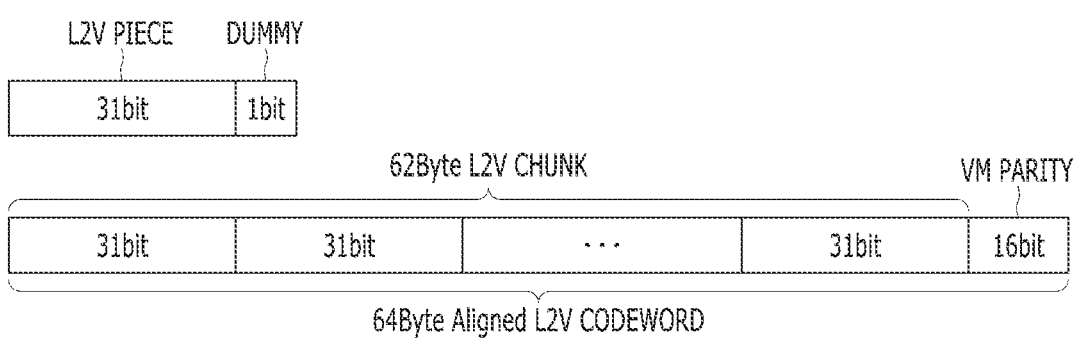
Figure 6C:
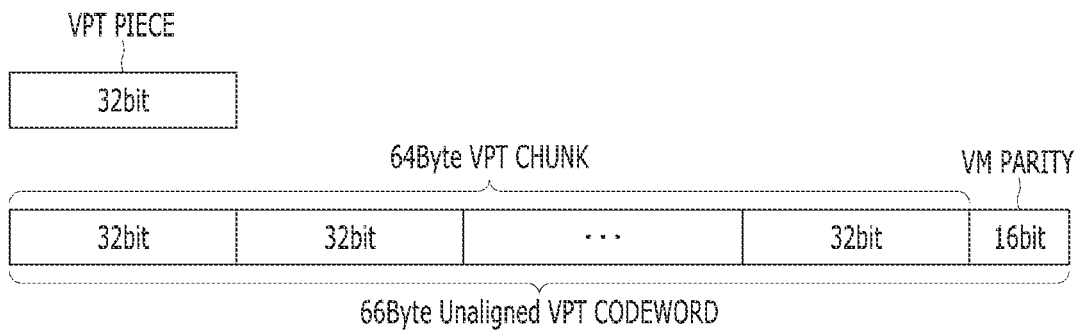

FIG. 6A to FIG. 6C are diagrams illustrating types of map data.

FIG. 6A is a diagram illustrating map data stored in the VM 144.

As described with reference to FIG. 1, the VM 144 may store the map codeword including the map chunk and the VM parity bit.

In the memory system 110, data may be mainly processed in units of bits of power of 2. For example, the processor 134 may process data in units of bits of power of 2, and the VM 144 and the NVM 150 may store data in units of bits of power of 2.

In an example in which the processor 134 processes 32-bit data per one cycle, the map piece may be composed of maximum 32-bit data. The map chunk may include map pieces corresponding to a power of 2. When one map piece is composed of 32-bit data, the size of the map chunk may also have a bit size corresponding to a power of 2.

The VM 144 may store a map codeword in which a VM parity bit has been added to the map chunk. When the map chunk corresponds to bits of a power of 2, the map codeword in which the VM parity bit has been added to the map chunk may not be a power of 2.

Since the VM 144 is addressed in units of power of 2, the case of mapping data, other than bits of a power of 2, with the address of the VM 144 may require a larger amount of operations than the case of mapping data of bits of a power of 2.

In order to reduce the amount of operations required when mapping the map codeword with the address of the VM 144 and the capacity of the map codeword occupied in the VM 144, the size of the map codeword when the memory system 110 is designed may be aligned to be bits of a power of 2.

FIG. 6A illustrates aligned codewords and unaligned codewords. An example of a map codeword whose size is aligned to bits of a power of 2 includes a logical to virtual (L2V) codeword. FIG. 6A illustrates the aligned codewords including L2V chunks and VM parity bits P, respectively.

An example of a map codeword whose size is unaligned includes a valid page table (VPT) codeword. FIG. 6A illustrates the unaligned codewords including VPT chunks and VM parity bits P, respectively. The L2V codeword is described in detail with reference to FIG. 6B and the VPT codeword is described in detail with reference to FIG. 6C.

FIG. 6B is a diagram illustrating the L2V codeword as an example of the aligned codeword.

The L2V codeword is a kind of map data and may occupy most of the map data stored in the VM 144, for example, about 95% thereof. One L2V piece may indicate mapping between one logical address and a virtual address corresponding thereto. The virtual address may be an address for indicating a defect-free space among physical memory spaces of the NVM 150, and may be mapped with physical addresses of normal memory blocks of the NVM 150. Depending on the implementation, data of less than 32 bits may indicate mapping between one logical address and one virtual address. FIG. 6B illustrates an L2V piece aligned to a 31-bit size.

In order to store a plurality of L2V pieces in the VM 144, the VM ECC component 146 may perform error correction encoding on an L2V chunk including a predetermined number of L2V pieces and generate an L2V codeword in which a VM parity bit has been added to the L2V chunk. In the example of FIG. 6B, the VM ECC component 146 may add a 16-bit VM parity bit to a 62-byte L2V chunk including 16 L2V pieces, thereby generating a 64-byte aligned L2V codeword.

When the processor 134 requests the L2V pieces stored in the VM 144, the VM ECC component 146 may perform error correction decoding on the L2V codeword including the L2V piece, extract an error-corrected L2V piece, and provide the processor 134 with 32-bit data in which 1-bit dummy data has been added to the extracted L2V piece.

By way of example, FIG. 6B illustrates the 31-bit L2V piece and the 64-byte L2V codeword; however, the present disclosure is not limited thereto. For example, the VM ECC component 146 may add a 16-bit VM parity bit to a 30-byte L2V chunk including eight 30-bit L2V pieces, thereby generating a 32-byte aligned L2V codeword.

FIG. 6C is a diagram illustrating the valid page table (VPT) codeword as an example of the unaligned codeword.

The VPT may indicate whether valid data has been stored in each of the pages of the NVM 150. The VPT codeword is a kind of map data, and may occupy a part of the map data stored in the VM 144, for example, about 5% or less thereof. Depending on the implementation, when 32-bit data is required to represent minimum information of the VPT, the size of the VPT piece may not be aligned to less than 32 bits. By way of example, FIG. 6C illustrates a VPT piece composed of the 32-bit data.

In order to store a plurality of VPT pieces in the VM 144, the VM ECC component 146 may perform error correction encoding on a VPT chunk including a predetermined number of L2V pieces and generate a VPT codeword in which a VM parity bit has been added to the VPT chunk. In the example of FIG. 6C, the VM ECC component 146 may add a 16-bit VM parity bit to a 64-byte VPT chunk including 16 VPT pieces, thereby generating a 66-byte unaligned VPT codeword.

As described with reference to FIGS. 6A to 6C, most of the map data stored in the VM 144 are aligned codewords and unaligned codewords may occupy a part of the map data.

In accordance with an embodiment of the present disclosure, when the memory system 110 is powered off, the memory I/F 142 may control the aligned codewords to be error-correction-decoded by the map ECC 214 by bypassing the VM ECC component 146 and control the unaligned codewords to be error-correction-decoded by the VM ECC component 146.

In an embodiment of the present disclosure, the VM ECC component 146 may be implemented to perform error correction decoding on both the aligned codewords and the unaligned codewords. In some embodiments, the map ECC component 214 may be implemented to process only the aligned codewords. When the map ECC component 214 may process only the aligned codewords, the map ECC component 214 may be simply implemented. Accordingly, the area occupied by the map ECC component 214 in the circuit of the memory system 110 may be reduced.

Since most of the map data stored in the VM 144 are the aligned codewords, even though the map ECC component 214 processes only the aligned codewords with an improved throughput, the throughput of the entire map codewords may be similar to that of the map ECC component 214. Accordingly, when the memory system 110 is powered off, the map data stored in the VM 144 may be quickly stored in the NVM 150.

Figure 7:
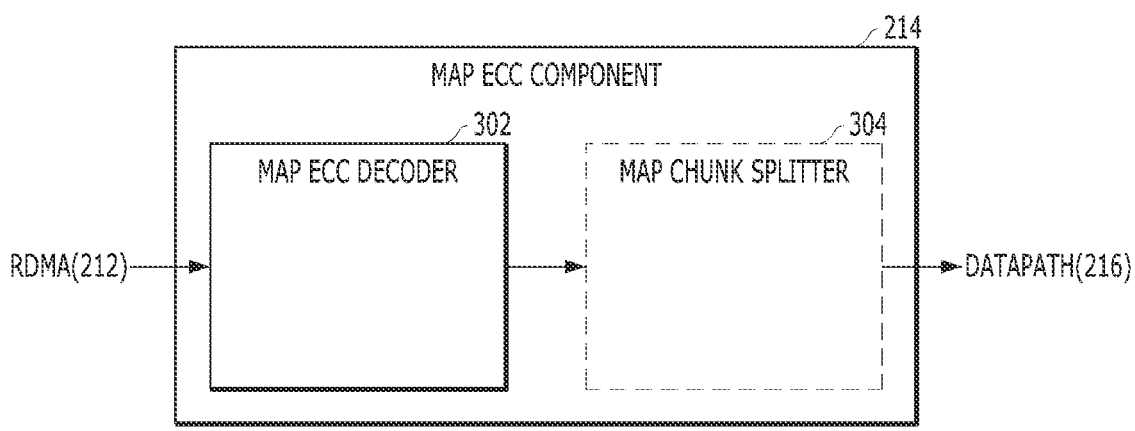
FIG. 7 is a diagram illustrating a map ECC component in accordance with an embodiment of the present disclosure.

FIG. 7 is a diagram illustrating the map ECC component 214 in accordance with an embodiment of the present disclosure.

Referring to FIG. 7, the map ECC component 214 may include a map ECC decoder 302 and a map chunk splitter 304.

The map ECC decoder 302 may perform error correction decoding on the aligned codeword.

The map chunk splitter 304 may perform a chunk split operation of removing a VM parity bit from the error-corrected aligned codeword and allowing a map chunk to have bits of a power of 2.

Figure 8A:
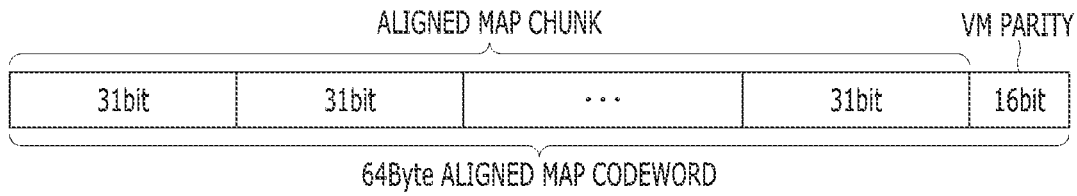
FIG. 8A and FIG. 8B are diagrams illustrating a chunk split operation of a map chunk splitter.
Figure 8B:
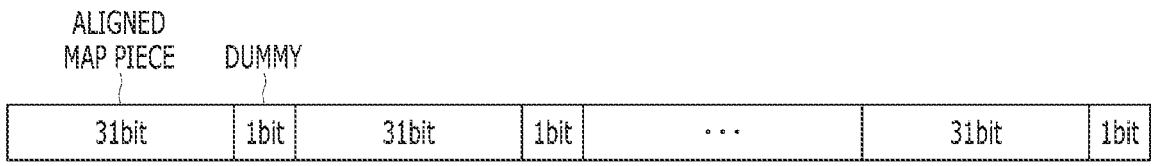

FIGS. 8A and 8B are diagrams illustrating the chunk split operation of the map chunk splitter 304.

FIG. 8A illustrates an aligned codeword before the chunk split operation is performed.

The aligned codeword in FIG. 8A may be substantially the same as or similar to the L2V codeword described with reference to FIG. 6B. The aligned codeword may include an aligned map chunk and a VM parity bit. The aligned map chunk may be composed of a predetermined number of successive map pieces. The aligned map piece may not have bits of a power of 2. The map chunk splitter 304 may remove the VM parity bit from the aligned codeword. Then, the map chunk splitter 304 may perform the chunk split operation of allowing each aligned map piece to have bits of a power of 2 by adding dummy data to each aligned map piece.

FIG. 8B illustrates a map chunk for which the chunk split operation has been completed.

The map chunk splitter 304 may remove the VM parity bit, and add dummy data having the same size as the VM parity bit such that the map chunk may have bits of a power of 2. Specifically, the map chunk splitter 304 adds 1-bit dummy data to each of the aligned map pieces, so that the aligned map pieces in the map chunk may not be successive and may be split.

When the dummy data is added to each of the aligned map pieces, each of the aligned map pieces may have bits of a power of 2. The aligned map chunk including the aligned map pieces having the dummy data added thereto may also have bits of a power of 2. Accordingly, the processor 134 may not perform a complicated mapping operation for storing the map chunk in the NVM 150.

The map chunk splitter 304 may be selectively activated according to the mode of the memory system 110. For example, when the memory system 110 operates in the first mode, the map chunk splitter 304 may be activated. When the memory system 110 operates in the second mode, the map chunk splitter 304 may be deactivated.

Figure 9:
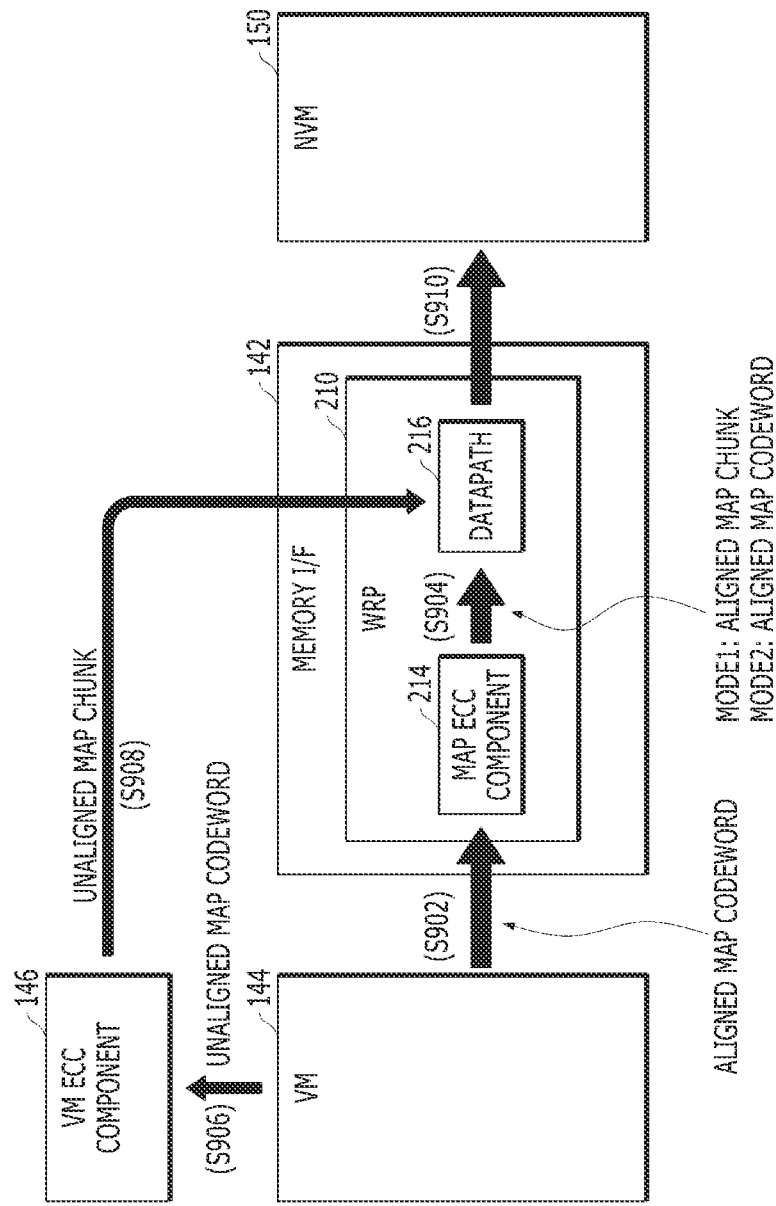
FIG. 9 is a diagram illustrating a power-off operation of a memory system in accordance with an embodiment of the present disclosure.
Figure 10:
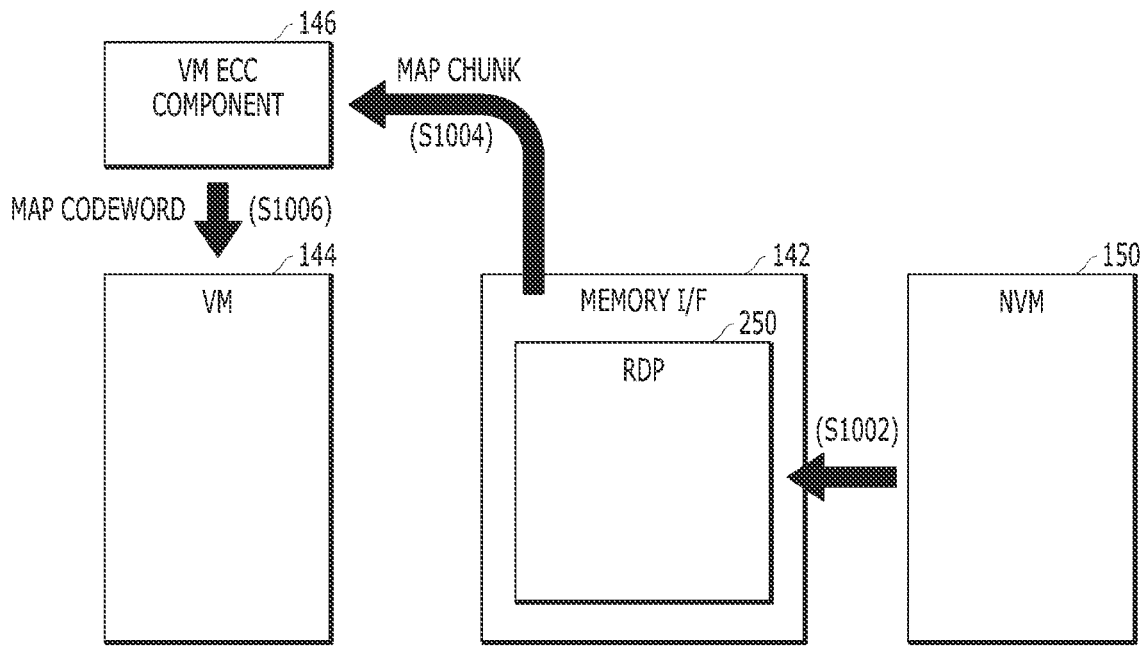
FIG. 10 is a diagram illustrating a booting operation of a memory system in accordance with a first mode.
Figure 11:
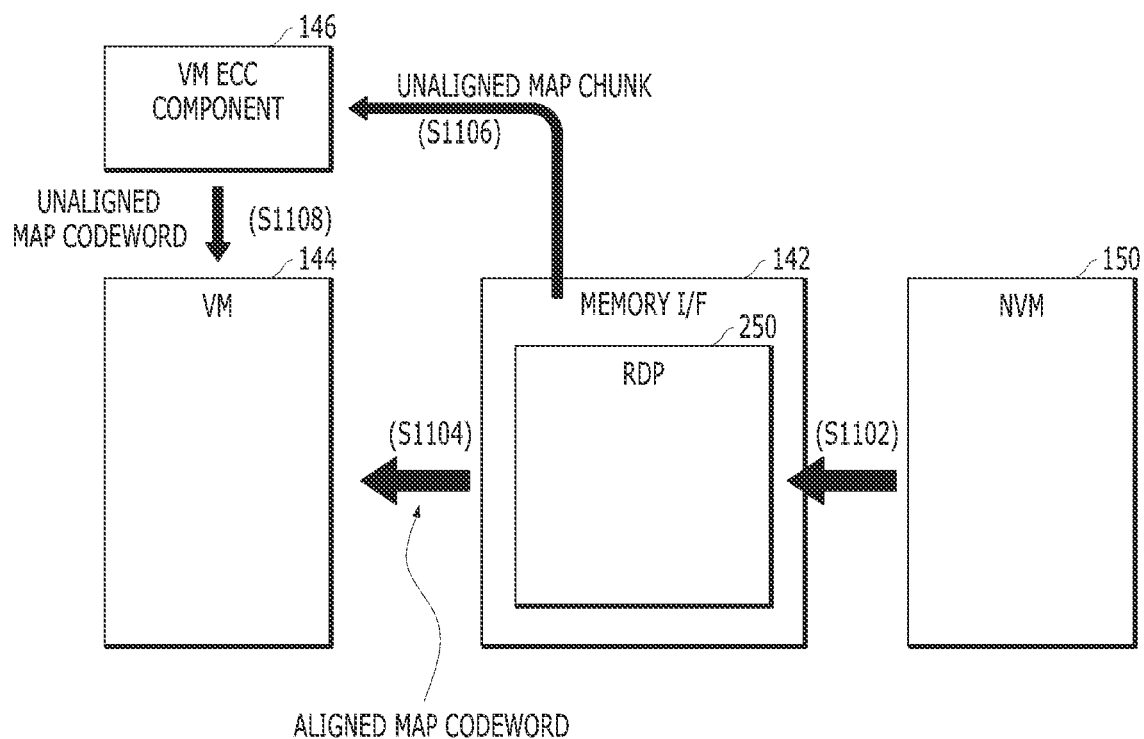
FIG. 11 is a diagram illustrating a booting operation of a memory system in accordance with a second mode.

Hereinafter, operations in accordance with an of the present disclosure are described with reference to FIGS. 9 to 11. FIGS. 9 to 11 schematically illustrate the memory I/F 142, the VM 144, the VM ECC component 146, and the NVM 150 described with reference to FIGS. 1 and 2.

FIG. 9 is a diagram illustrating the power-off operation of the memory system 110 in accordance with an embodiment of the present disclosure.

In response to the power-off signal of the memory system 110, the processor 134 may control the memory I/F 142 to program a plurality of map codewords in the VM 144 into the NVM 150. An operation in which the memory I/F 142 programs the plurality of map codewords into the NVM 150 is described in detail.

In operation S902, the map ECC component 214 may acquire a plurality of aligned codewords from the VM 144 and perform error correction decoding on the aligned codewords.

In operation S904, the map ECC component 214 may provide the data path 216 with error-corrected aligned map data.

When the first mode is selected in the memory system 110, the map chunk splitter 304 may be activated. The map ECC component 214 may remove VM parity bits from the error-corrected aligned codewords by using the map chunk splitter 304, and perform the chunk split operation described with reference to FIG. 8B. In the illustrated example of FIG. 9, when the first mode is selected, the aligned map data may include aligned map chunks.

When the second mode is selected in the memory system 110, the map chunk splitter 304 may be deactivated. The map ECC component 214 may provide the data path 216 with map codewords from which the VM parity bits have not been removed. In the illustrated example of FIG. 9, when the second mode is selected, the aligned map data may include aligned codewords.

The data path 216 may perform error correction encoding on the aligned map data by using the internal NVM ECC encoder, thereby generating map data to which NVM parity bits have been added.

In operation S906, in response to the power-off signal, the VM ECC component 146 may receive unaligned codewords from the VM 144, perform error correction decoding on the unaligned codewords, and remove VM parity bits from the error-corrected map codewords, thereby generating unaligned map chunks. As described with reference to FIG. 6C, the unaligned map chunk may have bits of a power of 2. Accordingly, the processor 134 may not perform a complicated mapping operation for storing the unaligned map chunks in the NVM 150.

In operation S908, the VM ECC component 146 may provide the data path 216 with the generated map chunks. The data path 216 may perform error correction encoding on the unaligned map chunks by using the internal NVM ECC encoder, thereby generating map data to which NVM parity bits have been added.

The operations on the aligned codewords in S902 and S904 and the operations on the unaligned codewords in S906 and S908 may be performed in parallel.

In operation S910, the data path 216 may provide the data, to which the NVM parity bits have been added in the operations of S904 and S908, to the NVM 150 through the CH-DMA component 230. The NVM 150 may program the data to which the NVM parity bits have been added. Then, the memory system 110 may be powered off.

In some embodiments, a method in which map data is loaded from the NVM 150 to the VM 144 during the booting of the memory system 110 may be changed according to the operation mode of the memory system 110. The method of loading the map data according to each mode is described with reference to FIGS. 10 and 11.

FIG. 10 is a diagram illustrating the booting operation of the memory system 110 in accordance with the first mode.

Referring to FIG. 10, after the memory system 110 is powered on, the processor 134 may control the memory I/F 142 to read map data from the NVM 150 in operation S1002.

The NVM 150 may output the map data under the control of the memory I/F 142. The NVM ECC decoder (not illustrated) included in the RDP 250 may perform error correction decoding on the outputted map data.

When the power-off operation has been performed in the first mode, the map data stored in the NVM 150 may include aligned map chunks, unaligned map chunks, and NVM parity bits added to the map chunks.

In operation S1004, the memory I/F 142 may provide the VM ECC component 146 with error-corrected map chunks. The map chunks may include the aligned map chunks and the unaligned map chunks. The VM ECC component 146 may perform error correction encoding on the map chunks, thereby generating map codewords.

In operation S1006, the VM ECC component 146 may store the map codewords in the VM 144 and complete the booting.

In accordance with an embodiment of the present disclosure, when the memory system 110 operates in the first mode, the map chunks may be simultaneously error-correction-decoded by the VM ECC component 146 without distinction of the aligned map chunks or the unaligned map chunks. Accordingly, an operation for distinguishing the aligned map chunks and the unaligned map chunks during the booting operation may be omitted.

FIG. 11 is a diagram illustrating the booting operation of the memory system 110 in accordance with the second mode.

After the memory system 110 is powered on, the processor 134 may control the memory I/F 142 such that the NVM 150 outputs map data, in operation S1102. When the power-off operation has been performed in the second mode, the map data may include aligned codewords and unaligned map chunks to which NVM parity bits have been added.

The NVM ECC decoder in the RDP 250 may perform error correction decoding on the outputted aligned codewords and unaligned map chunks by using the NVM parity bits.

In operation S1104, the memory I/F 142 may directly store the aligned codewords in the VM 144 by bypassing the VM ECC component 146. Since the aligned codewords occupy most of the map codewords, when the memory system 110 operates in the second mode, the bottleneck caused due to the VM ECC component 146 during the booting of the memory system 110 may be solved.

In operation S1106, the memory I/F 142 may provide the unaligned map chunks to the VM ECC component 146.

In operation S1108, the VM ECC component 146 may add VM parity bits to the unaligned map chunks, thereby generating unaligned codewords. The VM ECC component 146 may provide the unaligned codewords to the VM 144.

After the aligned codewords and the unaligned codewords are stored in the VM 144, the booting of the memory system 110 may be completed.

In some embodiments, in order to perform operations 1104, 1106, and 1108, the aligned codewords and the unaligned map chunks need to be distinguished. The processor 134 may distinguish the aligned codewords from the unaligned map chunks by referring to data journaled in the NVM 150, when the memory system 110 is powered off.

In accordance with an embodiment of the present disclosure described with reference to FIGS. 6A to 6C, 7, 8A and 8B, 9, 10, and 11, in order to store, in the NVM 150, map codewords stored in the VM 144, the map ECC component 214 of the memory I/F 142 may perform error correction decoding on the aligned codewords and the VM ECC component 146 may perform error correction decoding on the unaligned codewords. Since the map ECC component 214 is only implemented to be able to perform error correction decoding on the aligned codewords, the map ECC component 214 may occupy a small area in the memory system 110. Furthermore, the aligned codewords occupying most of the map codewords are decoded by the map ECC component 214, so that it is possible to shorten the power-off time of the memory system 110.

In accordance with various embodiments of the present disclosure, when the memory system 110 is powered off, the memory I/F 142 performs error correction decoding on at least a part of map data stored in the VM 144 by using the map ECC component 214 and stores the error-correction-decoded map data in the NVM 150 have been described; however, the present disclosure is not limited thereto. For example, the VM 144 may store meta data for the operation of the memory system 110. The meta data may further include block management data in addition to map data. The memory I/F 142 may perform error correction decoding on the meta data stored in the VM 144 by using the map ECC component 214 and store the error-correction-decoded meta data in the NVM 150.

The present disclosure described above is not limited by the aforementioned embodiments and the accompanying drawings, and it is apparent to those skilled in the art to the present disclosure pertains that various substitutions, modifications, and changes can be made without departing from the technical spirit of the present disclosure.

What is claimed is:

1. A memory system comprising:
a nonvolatile memory device;
a processor configured to generate a first map chunk including mapping information for accessing the nonvolatile memory device;
a first error correction code (ECC) component configured to generate a first map codeword by adding a first parity bit to the first map chunk;
a volatile memory configured to store the first map codeword;
a second ECC component configured to generate first map data by performing decoding on the first map codeword that is outputted from the volatile memory and bypasses the first ECC component when a power off operation of the memory system is performed; and
a direct memory access (DMA) component configured to provide the first map data to the nonvolatile memory device.

2. The memory system of claim 1, wherein the first ECC component has a lower latency than the second ECC component, and
the second ECC component has a higher throughput than the first ECC component.

3. The memory system of claim 2, further comprising:
a third ECC component configured to generate the first map data by performing the decoding on the first map codeword in parallel with the second ECC component when the power off operation of the memory system is performed.

4. The memory system of claim 1, wherein in a first mode, the first map data is the first map chunk in which the first parity bit has been removed from a decoded first map codeword, and
in a second mode, the first map data is a first map codeword in which the first parity bit of the decoded first map codeword is maintained.

5. The memory system of claim 4, wherein in the first mode, the DMA component further provides the first ECC component with the first map chunk acquired from the nonvolatile memory device when the memory system is booted, and
in the second mode, the DMA component further provides the volatile memory with the first map codeword that is acquired from the nonvolatile memory device when the memory system is booted by bypassing the first ECC component.

6. The memory system of claim 1, wherein the volatile memory further stores a second map codeword including a second map chunk generated by the processor and a second parity bit added by the first ECC component,
when the power off operation of the memory system is performed, the first ECC component generates the second map chunk by performing decoding on the second map codeword and removing the second parity bit therefrom, and
the DMA component further provides the second map chunk to the nonvolatile memory device.

7. The memory system of claim 6, wherein the first map codeword is a map codeword that is aligned to have a size of a power of 2, and
the second map codeword is an unaligned codeword that does not have a size of a power of 2.

8. The memory system of claim 7, wherein the aligned codeword includes a logical to virtual (L2V) map codeword, and
the unaligned codeword includes a valid page table (VPT) codeword.

9. The memory system of claim 7, wherein in a first mode, the first map data is the first map chunk in which the first parity bit has been removed from the decoded first map codeword, and
in a second mode, the first map data is the first map codeword in which the first parity bit of a decoded first map codeword is maintained.

10. The memory system of claim 9, wherein in the first mode, the DMA component further provides the first ECC component with the first map chunk that is acquired from the nonvolatile memory device when the memory system is booted, and
in the second mode, the DMA component further provides the volatile memory with the first map codeword that is acquired from the nonvolatile memory device when the memory system is booted by bypassing the first ECC component.

11. The memory system of claim 9, wherein the DMA component further provides the first ECC component with second map data that is acquired from the nonvolatile memory device when the memory system is booted, and
the first ECC component generates the second map codeword by adding a parity bit to the second map chunk, and further provides the second map codeword to the volatile memory.

12. The memory system of claim 7, further comprising:
a fourth ECC component configured to perform encoding in order to store the first map data and the second map chunk in the nonvolatile memory device, and perform error correction decoding on data acquired from the nonvolatile memory device.

13. A controller including a nonvolatile memory device, comprising:
a processor configured to generate a first map chunk including mapping information for accessing the nonvolatile memory device;
a first error correction code (ECC) component configured to generate a first map codeword by adding a first parity bit to the first map chunk;
a volatile memory configured to store the first map codeword;
a second ECC component configured to generate first map data by performing decoding on the first map codeword that is outputted from the volatile memory and bypasses the first ECC component when a power off operation of the memory system is performed; and
a direct memory access (DMA) component configured to provide the first map data to the nonvolatile memory device.

14. The controller of claim 13, wherein the first ECC component has a lower latency than the second ECC component, and
the second ECC component has a higher throughput than the first ECC component.

15. The controller of claim 13, wherein in a first mode, the first map data is a first map chunk in which the first parity bit has been removed from the decoded first map codeword, and
in a second mode, the first map data is a first map codeword in which the first parity bit of the decoded first map codeword is maintained.

16. The controller of claim 15, wherein in the first mode, the DMA component further provides the first ECC component with the first map chunk acquired from the nonvolatile memory device when the controller is booted, and in the second mode, the DMA component further provides the volatile memory with the first map codeword acquired from the nonvolatile memory device when the controller is booted by bypassing the first ECC component.

17. The controller of claim 13, wherein the volatile memory further stores a second map codeword including a second map chunk generated by the processor and a second parity bit added by the first ECC component, when the power off operation of the memory system is performed, the first ECC component generates the second map chunk by performing decoding on the second map codeword and removing the second parity bit therefrom, and the DMA component further provides the second map chunk to the nonvolatile memory device.

18. The controller of claim 17, wherein the first map codeword is a map codeword that is aligned to have a size of a power of 2, and the second map codeword is an unaligned codeword that does not have a size of a power of 2.

19. The controller of claim 18, wherein in a first mode, the first map data is a first map chunk in which the first parity bit has been removed from the decoded first map codeword, and in a second mode, the first map data is a first map codeword in which the first parity bit of the decoded first map codeword is maintained.

20. A memory system comprising:

a nonvolatile memory device; and a controller coupled to the nonvolatile memory device and including:

a volatile memory;

a processor configured to generate a map chunk including mapping information for accessing the nonvolatile memory device;

a first error correction code (ECC) component configured to encode the map chunk to generate a map codeword and provide the map codeword to the volatile memory such that the map codeword is stored in the volatile memory, the map codeword including the map chunk and a parity bit; and a memory interface coupled between the volatile memory and the nonvolatile memory device and between the first ECC component and the nonvolatile memory device, wherein the memory interface includes:

a second ECC component configured to receive the map codeword from the volatile memory when a power off operation of the memory system is performed, and decode the received map codeword to generate map data, the second ECC component having a higher throughput the first ECC component; and a direct memory access (DMA) component configured to receive the map data and provide the map data to the nonvolatile memory device.

* * * * *